(12) United States Patent
Wang et al.

(10) Patent No.: US 12,328,296 B2
(45) Date of Patent: Jun. 10, 2025

(54) MULTIFUNCTIONAL APPLICATION GATEWAY FOR SECURITY AND PRIVACY

(71) Applicant: BEIJING BYTEDANCE NETWORK TECHNOLOGY CO., LTD., Beijing (CN)

(72) Inventors: Jialin Wang, Singapore (SG); Fangfei Chen, Los Angeles, CA (US); Zengyao Wang, Singapore (SG); Zhiqiang Cui, Los Angeles, CA (US)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/681,348

(22) Filed: Feb. 25, 2022

(65) Prior Publication Data
US 2023/0073891 A1    Mar. 9, 2023

Related U.S. Application Data

(60) Provisional application No. 63/242,170, filed on Sep. 9, 2021.

(51) Int. Cl.
*H04L 9/40* (2022.01)
*H04L 41/40* (2022.01)
(Continued)

(52) U.S. Cl.
CPC .......... *H04L 63/0227* (2013.01); *H04L 41/40* (2022.05); *H04L 47/125* (2013.01);
(Continued)

(58) Field of Classification Search
CPC ... H04L 63/0227; H04L 47/125; H04L 47/19; H04L 63/1425; H04L 41/0816;
(Continued)

(56) References Cited

U.S. PATENT DOCUMENTS 7,464,147 B1 * 12/2008 Fakhouri ................ G06Q 10/04
709/223
10,268,835 B2 * 4/2019 Beckman ................ G06F 21/10
(Continued)

OTHER PUBLICATIONS

International Search Report mailed on Apr. 6, 2023 in International Application No. PCT/SG2022/050642 (3 pages).
(Continued)

*Primary Examiner* — Greg C Bengzon

(57) ABSTRACT

Systems and methods directed to an application gateway for security and privacy that supports security and compliance monitoring between production environments and virtual private clouds are described. In examples, the application gateway for security and privacy supports security and compliance logging making such information available to administrators and auditors; accordingly, the administrators and auditors can determine how the application gateway for security and privacy is behaving in a very detailed way. For example, by providing access to security and compliance logs, administrators and auditors can verify that the application gateway is not behaving in a malicious manner, such as but not limited communicating with an unauthorized host. In addition to including a user-friendly management interface that allows a user access to modify existing configurations in real-time, the application gateway for security and privacy may scale in a secure manner to support increasing and decreasing traffic demands.

13 Claims, 7 Drawing Sheets

(51) Int. Cl.
*H04L 47/125* (2022.01)
*H04L 47/19* (2022.01)
*H04L 41/0816* (2022.01)

(52) U.S. Cl.
CPC .......... *H04L 47/19* (2013.01); *H04L 63/1425* (2013.01); *H04L 41/0816* (2013.01)

(58) Field of Classification Search
CPC ..... H04L 63/20; H04L 67/02; H04L 41/0895; H04L 41/40; H04L 63/105; H04L 67/01; H04L 43/08; H04L 63/102; H04L 67/10; H04L 67/1097; H04L 41/046; H04L 41/0806; H04L 41/0896; H04L 41/12; H04L 43/20; H04L 63/02; H04L 63/0263; H04L 63/0428; H04L 63/10; H04L 67/34; H04L 67/56; H04L 67/565; H04L 67/5683; H04L 69/40; H04L 9/40; H04L 12/66; H04L 2209/56; H04L 41/0246; H04L 41/044; H04L 41/0668; H04L 41/0803; H04L 41/0813; H04L 41/082; H04L 41/0823; H04L 41/0853; H04L 41/0866; H04L 41/0876; H04L 41/0893; H04L 41/0897; H04L 41/122; H04L 41/142; H04L 41/145; H04L 41/50; H04L 41/5096; H04L 43/028; H04L 43/045; H04L 43/065; H04L 45/42; H04L 45/44; H04L 45/586; H04L 47/70; H04L 47/726; H04L 47/783; H04L 47/787; H04L 61/5007; H04L 61/5061; H04L 61/5084; H04L 63/0218; H04L 63/0272; H04L 63/0435; H04L 63/062; H04L 63/08; H04L 63/0807; H04L 63/0853; H04L 63/101; H04L 63/1416; H04L 63/1433; H04L 67/1001; H04L 67/1004; H04L 67/1031; H04L 67/1034; H04L 67/104; H04L 67/1095; H04L 67/51; H04L 67/535; H04L 67/566; H04L 67/60; H04L 67/75; H04L 69/14; H04L 69/18; H04L 69/22; H04L 9/0866; H04L 9/3213; H04L 9/3239; H04L 9/50; G06F 9/45558; G06F 21/6218; G06F 2009/45595; G06F 21/6227; G06F 21/629; G06F 2009/4557; G06F 8/65; G06F 11/2025; G06F 21/10; G06F 21/16; G06F 2201/815; G06F 2221/2143; G06F 3/04817; G06F 8/60; G06F 8/71; G06F 9/455; G06F 9/5083; G06F 11/07; G06F 11/203; G06F 11/2041; G06F 11/2048; G06F 11/30; G06F 16/00; G06F 16/182; G06F 16/245; G06F 16/24545; G06F 16/24549; G06F 16/24554; G06F 16/2471; G06F 16/248; G06F 16/275; G06F 16/951; G06F 16/958; G06F 2009/45575; G06F 2009/45587; G06F 21/44; G06F 2209/5014; G06F 2209/5019; G06F 2209/5022; G06F 2209/506; G06F 2209/508; G06F 2221/2145; G06F 3/0482; G06F 3/0605; G06F 3/0617; G06F 3/065; G06F 3/0665; G06F 3/067; G06F 8/20; G06F 8/30; G06F 8/34; G06F 8/36; G06F 8/40; G06F 9/30079; G06F 9/445; G06F 9/466; G06F 9/4881; G06F 9/5005; G06F 9/5027; G06F 9/505; G06F 9/5072; G06F 9/5088; G06F 9/54
See application file for complete search history.

(56) References Cited

U.S. PATENT DOCUMENTS

| | | | | |
|---|---|---|---|---|
| 10,439,878 | B1* | 10/2019 | Tah | H04L 69/40 |
| 10,484,297 | B1* | 11/2019 | McClenahan | G06F 11/2041 |
| 10,785,122 | B2* | 9/2020 | Inamdar | H04L 67/535 |
| 10,812,366 | B1* | 10/2020 | Berenberg | H04L 41/0893 |
| 10,824,756 | B2* | 11/2020 | Beckman | G06F 21/629 |
| 10,887,380 | B2* | 1/2021 | Pahwa | H04L 67/52 |
| 10,931,741 | B1* | 2/2021 | Liguori | G06F 8/63 |
| 11,023,301 | B1* | 6/2021 | Hornbeck | G06F 8/63 |
| 11,032,160 | B1* | 6/2021 | Raheja | H04L 41/0843 |
| 11,159,366 | B1* | 10/2021 | Gawade | H04L 41/0895 |
| 11,201,955 | B1* | 12/2021 | Sachdeva | H04L 41/40 |
| 11,238,045 | B2* | 2/2022 | Chainani | G06F 16/245 |
| 11,271,969 | B2* | 3/2022 | Pitre | H04L 63/20 |
| 11,316,690 | B2* | 4/2022 | Madisetti | H04L 41/044 |
| 11,316,822 | B1* | 4/2022 | Gawade | G06F 11/2025 |
| 11,457,080 | B1* | 9/2022 | Meduri | H04L 67/60 |
| 2006/0036463 | A1* | 2/2006 | Patrick | G06Q 10/10 705/1.1 |
| 2006/0167836 | A1* | 7/2006 | Chatterjee | G06F 9/5083 |
| 2008/0228851 | A1* | 9/2008 | Angelov | H04L 67/02 709/201 |
| 2008/0228860 | A1* | 9/2008 | Angelov | G06F 16/958 709/202 |
| 2009/0271472 | A1* | 10/2009 | Scheifler | G06F 9/5072 709/202 |
| 2015/0006732 | A1* | 1/2015 | Schmidt | G06F 9/5072 709/226 |
| 2015/0088934 | A1* | 3/2015 | Beckman | H04L 63/0428 707/781 |
| 2016/0359705 | A1* | 12/2016 | Parandehgheibi | H04L 43/0882 |
| 2017/0339247 | A1* | 11/2017 | Tiwari | H04L 41/0895 |
| 2018/0083835 | A1* | 3/2018 | Cole | G06F 3/0482 |
| 2018/0270125 | A1* | 9/2018 | Jain | G06F 16/00 |
| 2018/0373505 | A1* | 12/2018 | Engquist | G06F 8/34 |
| 2019/0098056 | A1* | 3/2019 | Pitre | G06F 21/6218 |
| 2019/0102226 | A1* | 4/2019 | Caldato | G06F 11/3644 |
| 2019/0123983 | A1* | 4/2019 | Rao | H04L 41/14 |
| 2019/0123985 | A1* | 4/2019 | Rao | H04L 43/062 |
| 2019/0228177 | A1* | 7/2019 | Beckman | G06F 21/629 |
| 2019/0238633 | A1* | 8/2019 | Rao | H04L 41/0895 |
| 2020/0067879 | A1* | 2/2020 | Lemay | H04L 41/0853 |
| 2020/0112487 | A1* | 4/2020 | Inamdar | H04L 67/14 |
| 2020/0213336 | A1* | 7/2020 | Yu | G06N 3/08 |
| 2020/0278892 | A1* | 9/2020 | Nainar | H04L 67/10 |
| 2020/0280592 | A1* | 9/2020 | Ithal | H04L 67/1001 |
| 2020/0296112 | A1* | 9/2020 | Namboodiri | G06F 21/44 |
| 2020/0314015 | A1* | 10/2020 | Mariappan | H04L 41/0895 |
| 2020/0314173 | A1* | 10/2020 | Pahwa | H04L 67/1029 |
| 2020/0329098 | A1* | 10/2020 | Boddam | G06F 11/3692 |
| 2021/0019194 | A1* | 1/2021 | Bahl | G06F 9/3877 |
| 2021/0200814 | A1 | 7/2021 | Tal et al. | |
| 2021/0240517 | A1* | 8/2021 | Mohapatra | G06F 9/45558 |
| 2022/0012045 | A1* | 1/2022 | Rudraraju | G06Q 30/02 |
| 2022/0027051 | A1* | 1/2022 | Kant | G06F 3/0605 |
| 2022/0030649 | A1* | 1/2022 | Popescu | H04L 61/4511 |
| 2022/0035684 | A1* | 2/2022 | Gupte | G06F 9/5083 |
| 2022/0038311 | A1* | 2/2022 | Shen | H04L 12/66 |
| 2022/0174096 | A1* | 6/2022 | Schmitt | H04L 63/062 |
| 2022/0350675 | A1* | 11/2022 | Navali | H04L 47/781 |
| 2023/0004436 | A1* | 1/2023 | Bai | G06F 9/5033 |

OTHER PUBLICATIONS

Sookocheff, K., "A Guide to the Kubernetes Networking Model," Jul. 11, 2018 (30 pages).
Fabrice, "ELB vs. ALB vs. NLB: Choosing the Best AWS Load Balancer for your Needs," IAMONDEMAND blog, Sep. 22, 2020 (14 pages).
European Search Report for EP Patent Application No. 22867811.6, Issued on Jul. 2, 2024, 8 pages.

(56) References Cited

OTHER PUBLICATIONS

Written Opinion for International Application No. PCT/SG2022/050642, mailed Apr. 6, 2023, 4 Pages.

* cited by examiner

MULTIFUNCTIONAL APPLICATION GATEWAY FOR SECURITY AND PRIVACY

CROSS-REFERENCE TO RELATED APPLICATIONS

This application claims priority to U.S. Provisional Application Ser. No. 63/242,170, filed Sep. 9, 2021, and titled "MULTIFUNCTIONAL APPLICATION GATEWAY", the disclosure of which is incorporated herein by reference in its entirety.

BACKGROUND

Datacenters are widely used to enhance service quality by running services and caching contents in cloud environments. Many companies adopt datacenters to reduce cost and further improve service quality; however, using datacenters may bring risks in user privacy. For example, user information including, but not limited to, user internet protocol addresses, usernames, passwords, payment information, and other user sensitive data may be identified, tracked, and/or otherwise compromised. Accordingly, such potential security issues may jeopardize the adoption of datacenters in regions governed by national and/or geographic user and data privacy regulations, where user data and user privacy are of top concerns.

Oftentimes, even if a central datacenter, such as a technology partner appointed by a local jurisdictional entity, is involved and provides a trusted infrastructure for a company to operate on or otherwise use, it is often difficult if not impossible for the technology partner to provide the needed secure infrastructure due to its wide distribution nature and use as well as the needed scalability for handling traffic loads of various sizes. For example, many native layer 7 load balancing solutions employed by many datacenters provide poor functionality when dealing with configuration changes and added capabilities. In examples, a load balancer of a datacenter may be controlled by a configuration file where changes to the file are made by modifying the file and then requiring a restart of the load balancer—during which, the load balance is unavailable, may cause traffic losses, and may negatively impact business for the datacenter and for businesses utilizing the datacenter's services. Further, traditional load balancers support basic functionalities and may not fulfill the business needs in terms of growth for a particular company or product. Accordingly, a solution is lacking that integrates a scalable and trusted solution when working with trusted technology providers and further while adhering to user and data privacy laws and regulations.

BRIEF SUMMARY

In accordance with examples of the present disclosure, a generalized solution and framework are described that provide a scalable application gateway to address secure computing and traffic routing needs of many datacenters. Such framework allows datacenters to continue to provide enhanced service quality in regions where user data and user privacy are of top concerns. Further, an application gateway for security and privacy, as part of a larger datacenter infrastructure, allows the datacenter to employ configuration and change management techniques to a production environment without restarting the application gateway for security and privacy as a whole such that the infrastructure can be updated without requiring much effort. The application gateway for security and privacy also provides additional support for features like service discovery, rate limiting, canary releasing, etc.

In accordance with examples of the present disclosure, the application gateway for security and privacy supports additional security and compliance features by filtering and modifying traffic using a web application firewall (WAF). The application gateway for security and privacy also supports multiple protocols including but not limited to QUIC, HTTP/2, and Web Socket over TLS encryption adding additional security layers to the communication infrastructure. Additionally, the application gateway for security and privacy also provides a logging and baseline metric system for administrators and users to audit and observe traffic in a comprehensive way.

In accordance with examples of the present disclosure, the application gateway for security and privacy may include a layer four load balancer, a plurality of processing pods including one or more processing containers, and a management backend configured to provide a configuration implementation to the one or more processing containers, the configuration implementation specifying one or more processing parameters for each of the processing containers. In some examples, each processing pod of the plurality of processing pods includes one or more processing containers configured to perform layer seven network traffic processing on network traffic received from the layer four load balancer in accordance with the one or more processing parameters.

In accordance with examples of the present disclosure, a method of providing enhanced security using an application gateway for security and privacy is described. The method may include receiving network traffic at a layer four load balancer of the application gateway for security and privacy, determining, by a layer four load balancer, at least one processing pod to send a portion of the received network traffic for further processing, and routing, by the layer four load balancer, the portion of the received network traffic to the determined at least one processing pod. In examples, each processing pod of the plurality of processing pods includes one or more processing containers that is configured to perform layer seven network traffic processing on network traffic received from the layer four load balancer.

In accordance with examples of the present disclosure, a computer-readable storage medium is described. The computer-readable storage medium may include instructions, which when executed by a processor, causes the processor to: receive network traffic at a layer four load balancer of an application gateway for security and privacy, determine at least one processing pod to send a portion of the received network traffic for further processing, and route, by a layer four load balancer, the portion of the received network traffic to the determined at least one processing pod. In examples, each processing pod of the plurality of processing pods includes one or more processing containers that is configured to perform layer seven network traffic processing on network traffic received from the layer four load balancer.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
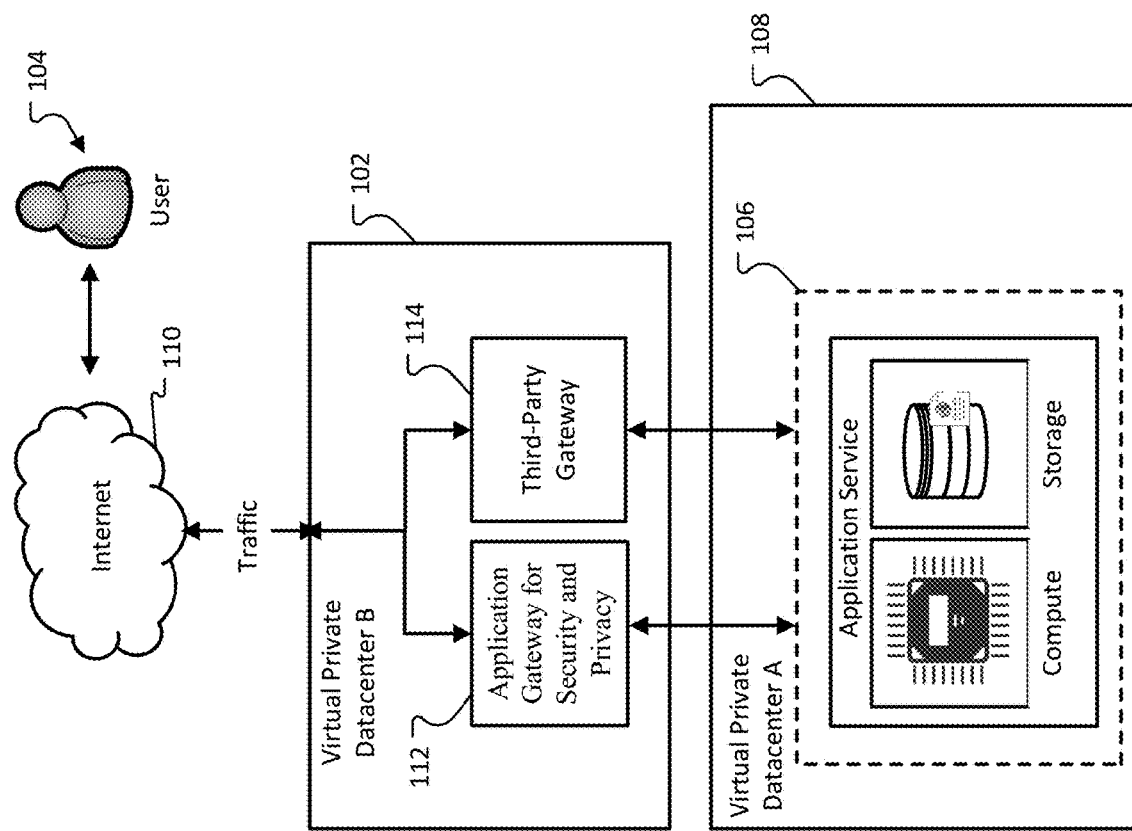
FIG. 1 depicts an example solution and framework that provides enhanced service quality in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a virtual private datacenter may include an application gateway for security and privacy to filter, screen, and/or modify one or more requests coming into the virtual private datacenter as well as the associated response that is attempting to leave the virtual private datacenter. The security and compliance features provided by the application gateway for security and privacy makes it easier for an administrator, user, and/or auditor to determine what the application gateway for security and privacy is doing in a very detailed way. The application gateway for security and privacy therefore, provides the users confidence that the configurations work well and provides auditors sufficient information that the application gateway for security and privacy is not doing anything malicious or otherwise servicing malicious requests.

In addition, the application gateway for security and privacy allows one to make changes to a production environment without restarting the component so the information and configuration used by the application gateway for security and privacy can be updated in a painless manner. The application gateway for security and privacy provides additional support for features including, but not limited to service discovery, rate limiting, canary releasing, etc. Further, the application gateway for security and privacy provides its users and administrators separate GUI control panels, so they won't need to write any configuration files but can make a change to the application gateway for security and privacy firewall with minimal interaction.

The application gateway for security and privacy allows users to operate a fleet of the resource by interacting with an application gateway for security and privacy manager. The application gateway for security and privacy manager includes a frontend and a backend. Thus, an auditor can access essential information for the application gateway for security and privacy by making a call to a management API or using the application gateway for security and privacy manager. While serving traffic, the application gateway for security and privacy can interact with the trusted virtual private datacenter to stream essential logging/auditing information to the auditors or storage areas associated with a location accessible to auditors.

The application gateway for security and privacy may include different components including a frontend user interface, a backend manager, a Kubernete or processing container, a controller, the Kubernetes or processing container pods or clusters, a layer 7 load balancer running upon the Kubernetes or processing containers, and a layer 4 load balancer and its associated controller, wherein layer 7 and layer 4 refer to respective layers of the Open Systems Interconnection (OSI) Model. In the OSI Model, communications between computing systems are split into seven different abstraction layers: Physical (layer 1), Data Link (layer 2), Network (layer 3), Transport (layer 4), Session (layer 5), Presentation (layer 6), and Application (layer 7). In examples, a Kubernetes describes a set of building blocks that collectively provide mechanisms to deploy, maintain, and scale applications based on CPU, memory, custom metrics, and combinations thereof.

The frontend user interface may comprise a platform that allows users and administrators direct access to the one or more configurations. For example, the front end user interface may provide a webpage that enables user the ability to configure the application gateway for security and privacy. The backend interacts with the frontend and the Kubernete or processing container controller; the backend may take the requests from the frontend and convert them into instructions and configurations to be implemented at the processing container controller and layer 7 load balancer. The processing container controller is configured to control the Kubernetes cluster and/or the processing container clusters and/or pods, thereby establishing or controlling the capacity of the application gateway. The processing container controller is responsible for creating pods that contain layer 7 load balancer instances that serve traffic. After the layer 7 load balancers are provisioned, they can fetch configurations and report their readiness to a layer 4 load balancer controller so that they can start serving traffic.

In examples, an existing layer 7 load balancer may be extended (e.g., via nginx plugin for example) such that each request/response, in plain text, can be processed by custom code or scripts written by a technology partner. This custom code may be in a Turing complete language and may have access to the full request/response including HTTP headers and body, in plain text relevant request metadata (e.g., source IP, timestamp, TCP and TLS session) and resolved routing information (e.g., destination IP, target microservice, etc.). The code may select some requests (and responses) and forward these (along with other metadata) to an anomaly network traffic detection component for out-of-band analysis. The code may reject/drop some requests/responses; therefore, the code may run before a request is forwarded (but after routing decisions are resolved). In examples, the technology partner may update the code quickly, without restarting the load balancer. The CPU/memory capacity may be allocated for processing at the load balancer.

In examples, the code may have access to transient storage to allow state to be maintained from one request to the next; in addition, the code may have access to permanent storage for logging and pushing statistics. Further, the code may be able to initiate secure communication with other technology partner components and implement security and compliance features like logging and auditing, including WAF related features for filtering/modifying traffic. In examples, the scalability empowered by the processing container controller allows the layer 7 load balancer to scale up and scale down with ease. Further, a frontend and backend makes the configuration update for one or more components of the load balancer easier for users and administrators. In addition, the described system includes functionality to support multiple protocols including but not limited to QUIC/WebSocket/RPC. In accordance with examples of the present disclosure, the application gateway for security and privacy can be integrated with different layer 4 load balancers.

FIG. 1 depicts an example solution and framework that provides enhanced service quality in accordance with examples of the present disclosure. The framework depicted in FIG. 1 utilizes a datacenter, such as the virtual private datacenter B 102 to perform an initial processing of requests received from a user, such as user 104. For example, a user 104 may initiate a request for one or more application services 106 residing at a virtual private datacenter A 108. Such request may be sent from the user 104, via the internet 110, and received at the virtual private datacenter B 102. The virtual private datacenter B 102 may utilize an application gateway for security and privacy 112 to restrict, screen, and/or limit information flowing into and out of the virtual private datacenter A 108. In examples, the virtual datacenter A 108 may be a trusted technology provider and may be approved by one or more organizations, government entities, or the like. Alternatively, or in addition, the virtual private datacenter A 108 may be designated as complying with one or more data privacy and/or user privacy regulations or security levels as evidenced by a certification of such compliance. For example, the virtual private datacenter A 108 may be audited on a regular or otherwise periodic basis to achieve and/or maintain such designation. In examples, the virtual private datacenter A 108 may provide one or more application services 106 which may include compute and/or storage services. As further depicted in FIG. 1, a request initiated from the virtual private datacenter A 108 may be sent through the third-party gateway 114, where the third-party gateway 114 may restrict, screen, and/or limit information flowing out of and into the virtual private datacenter A 108. In examples, the virtual private datacenter A 108 may be owned and/or operated by an entity or organization that is different from the virtual private datacenter B 102.

Figure 2:
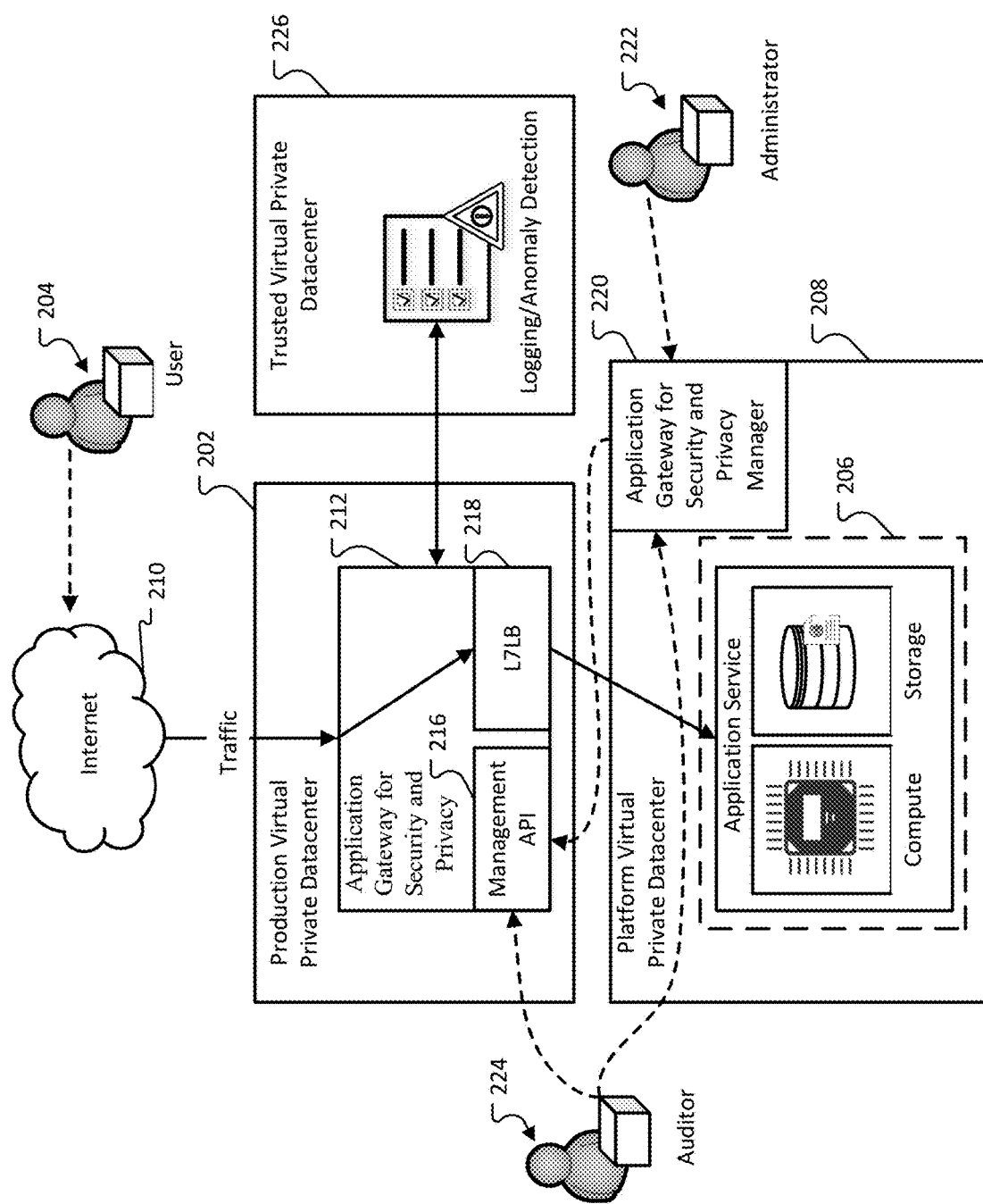
FIG. 2 depicts an example of a generalized solution and framework that provides an application gateway for servicing incoming requests for a computing infrastructure in accordance with examples of the present disclosure.

FIG. 2 depicts additional details of an example solution and framework that provides enhanced service quality in accordance with examples of the present disclosure. Similar to FIG. 1, the framework depicted in FIG. 2 utilizes a datacenter, such as the production virtual private datacenter 202 to perform an initial processing of requests received from a user, such as user 204. For example, a user 204 may initiate a request for one or more application services 206 residing at a platform virtual private datacenter 208. In examples, the platform virtual private datacenter 208 may be owned and/or operated by an entity or organization that is different from the production virtual private datacenter 202. Such request may be sent from the user 204, via the internet 210, and received at the production virtual private datacenter 202. The production virtual private datacenter 202 may utilize an application gateway for security and privacy 212 to restrict, screen, and/or limit information flowing into and out of the platform virtual private datacenter 208. In examples, the platform virtual datacenter 208 may be a trusted technology provider and may be approved by one or more organizations, jurisdictional entities, or the like. Alternatively, or in addition, the platform virtual private datacenter 208 may be designated as complying with one or more data privacy and/or user privacy regulations or security levels as evidenced by a certification of such compliance. For example, the platform virtual private datacenter 208 may be audited on a regular or otherwise periodic basis to achieve and/or maintain such designation. In examples, the platform virtual private datacenter 208 may provide one or more application services 206 which may include compute and/or storage services.

The application gateway for security and privacy 212 may include a layer 7 load balancer 218 and a management application programing interface (API) 216. The layer 7 load balancer 218 may be comprised of a scalable plurality of pods including a plurality of processing containers, or Kubernetes configured to filter, or screen, information flowing from the request provided by the user 204 and the platform virtual private datacenter 208. For example, the layer 7 load balancer 218 may scale up or scale down depending on an amount of traffic received by at the production virtual private datacenter 202. Moreover, one or more administrators 222 may initiate a configuration change by interfacing with the application gateway for security and privacy manager 220, where the application gateway manager 220 may cause a new pod configuration or policy to be utilized by the pod including a plurality of processing containers or Kubernetes, comprising the layer 7 load balancer 218.

As further depicted in FIG. 2, an auditor 224 may have access to logs, configuration files, and/or policy related information concerning the implementation of the application gateway for security and privacy 212. For example, the auditor 224 may view traffic logging information provided by each of the pods including a plurality of processing containers or Kubernetes, comprising the layer 7 load balancer 218. As another example, the auditor 224 may have view logs related to change requests performed at the application gateway for security and privacy manager 220 as well as other information available via logging and/or anomaly detection processing occurring at or otherwise stored at a trusted virtual private datacenter 226. In examples, the layer 7 load balancer 217 may perform aspects of anomaly detection and store such results at the trusted virtual datacenter 226.

Figure 3:
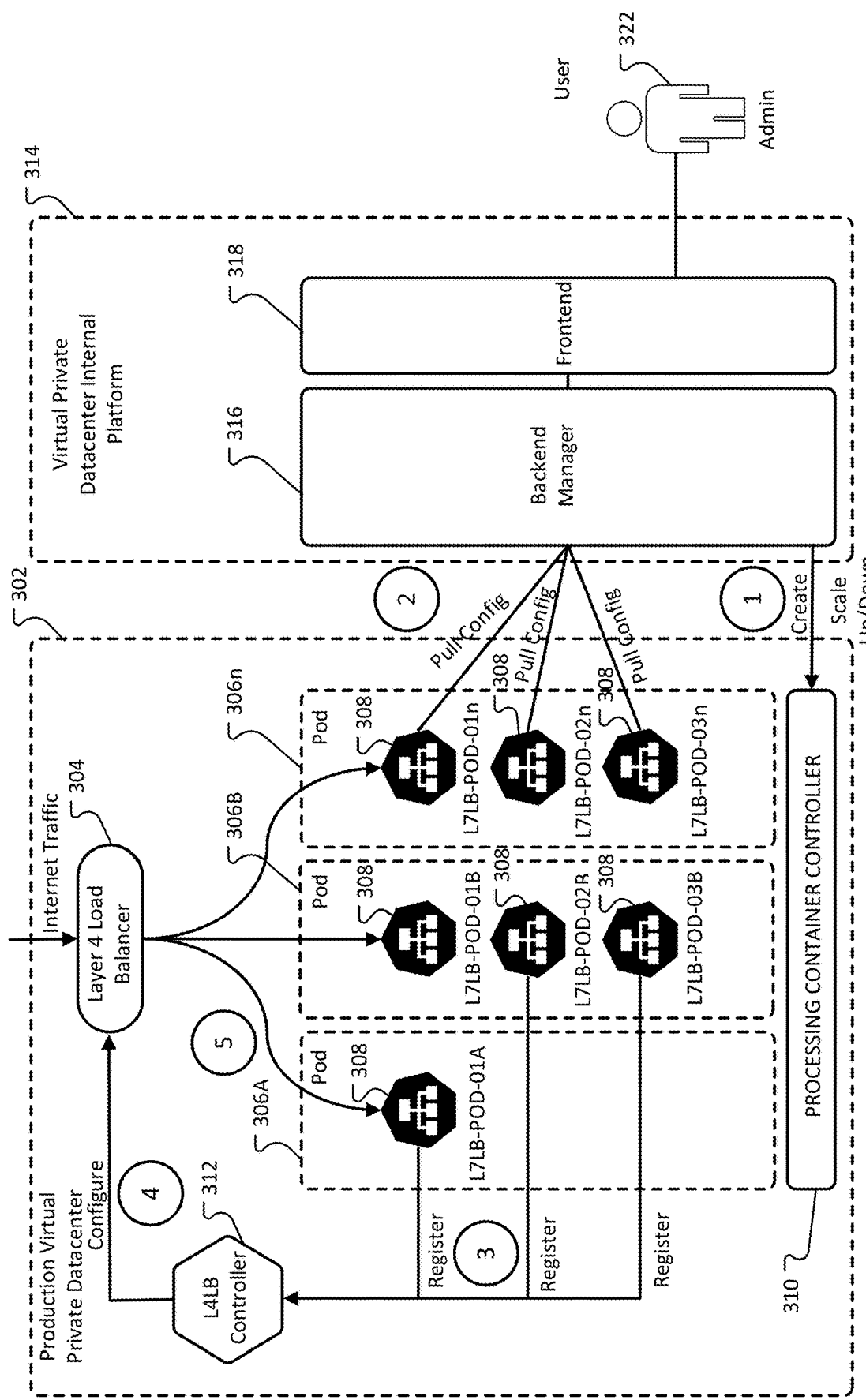
FIG. 3 depicts additional details of an application gateway in accordance with examples of the present disclosure.

FIG. 3 depicts additional details of the layer 7 load balancer 218 of FIG. 2 together with a change management/scaling example in accordance with examples of the present disclosure. More specifically, the production virtual private datacenter 302 may receive internet traffic, including one or more requests, and route the traffic to one or more components of the application gateway for security and privacy as described in FIG. 2. The application gateway for security and privacy may include a layer 7 load balancer as previously described. The layer 7 load balancer (e.g., 218) may include one or more components to perform layer 4 load balancing (e.g., managing and/or balancing transport-layer protocols, such as but not limited to TCP, UDP, DCCP, and SCTP used to control the volume of data, where it is sent, and at what rate). For example, a layer 4 load balancer 304 may determine which pod 306A-306n to send received traffic for further processing. Each pod 306A-306n may include one or more Kubernetes, or processing containers 308, that performs traffic processing at the application (e.g., layer 7) level. Although each processing container 308 includes the same reference character (e.g., 308), each processing container may be configured to perform processing specific to one or more requirements of the pod 306A-306n. The number of processing containers 308 and pod to which the processing container belongs may be controlled by the processing container controller 310.

For example, an administrator 322 may interact with a frontend 318 manager to provide one or more commands to a backend manager 316 located in an internal platform virtual datacenter 314. In examples, and based on one or more parameters, such as but not limited to an amount of traffic, the processing container controller 310 may initiate the creation of a Kubernete, or processing container 308, to be included in a new or existing pod 306A-306n. Once the processing container is created, the processing container may pull a processing configuration file from the backend manager 316. The processing configuration may include information indicating what kind of domain does the processing container server, what kind of protocol does the processing container server, what kind of origination policy does the processing container implement, and other detailed configuration information. Once created, the layer 4 load balancer controller 312 may register the newly created processing container with the layer 4 load balancer 304 such that the layer 4 load balancer 304 may include the new processing container as a resource to route traffic to.

In examples, each of the processing containers 308 may be configured to poll or pull the backend manager 316 on a periodic basis to determine if a new configuration file is available. Where a new configuration file is available, each of the processing containers 308 may perform an update at a time that is different from at least one other processing container 308, thereby ensuring a certain processing throughput is available and remains available. In addition, when traffic decreases to the point where not as many processing containers 308 are needed at one time, one or more processing containers maybe suspended or otherwise discarded.

Figure 4:
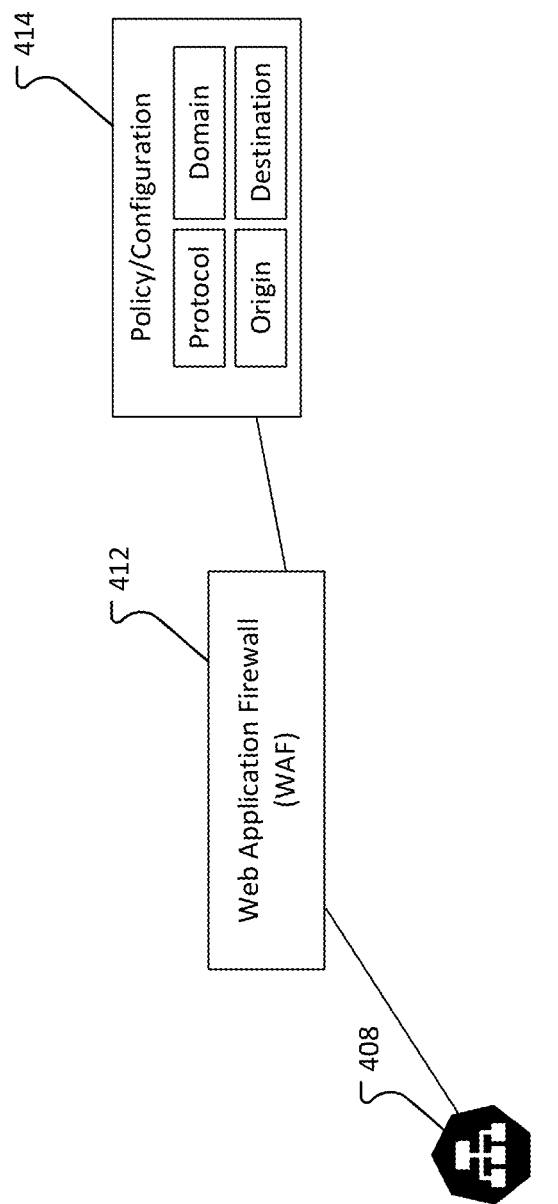
FIG. 4 depicts additional details of a web application firewall (WAF) in accordance with examples of the present disclosure.

FIG. 4 depicts additional details of each processing container 308 in accordance with examples of the present disclosure. Each processing container 408 may be the same as or similar to the processing container 308 as previously described. Each processing container may include a web application firewall 412 configured to filter incoming and outgoing data. For example, the web application firewall may include policy/configuration information 414 indicating a protocol to process, a domain to process, a origin to process, and/or a destination to process. In examples, if an incoming request does not match the protocol, domain, origin, and/or destination, the WAF 412 may cause the request to be logged and then dropped. Alternatively, or in addition, if an incoming request does not match the protocol, domain, origin, and/or destination, the WAF 412 may cause the request to be routed to another pod and/or processing container 408 based on one or more of the protocol, domain, origin, and/or destination.

Figure 5:
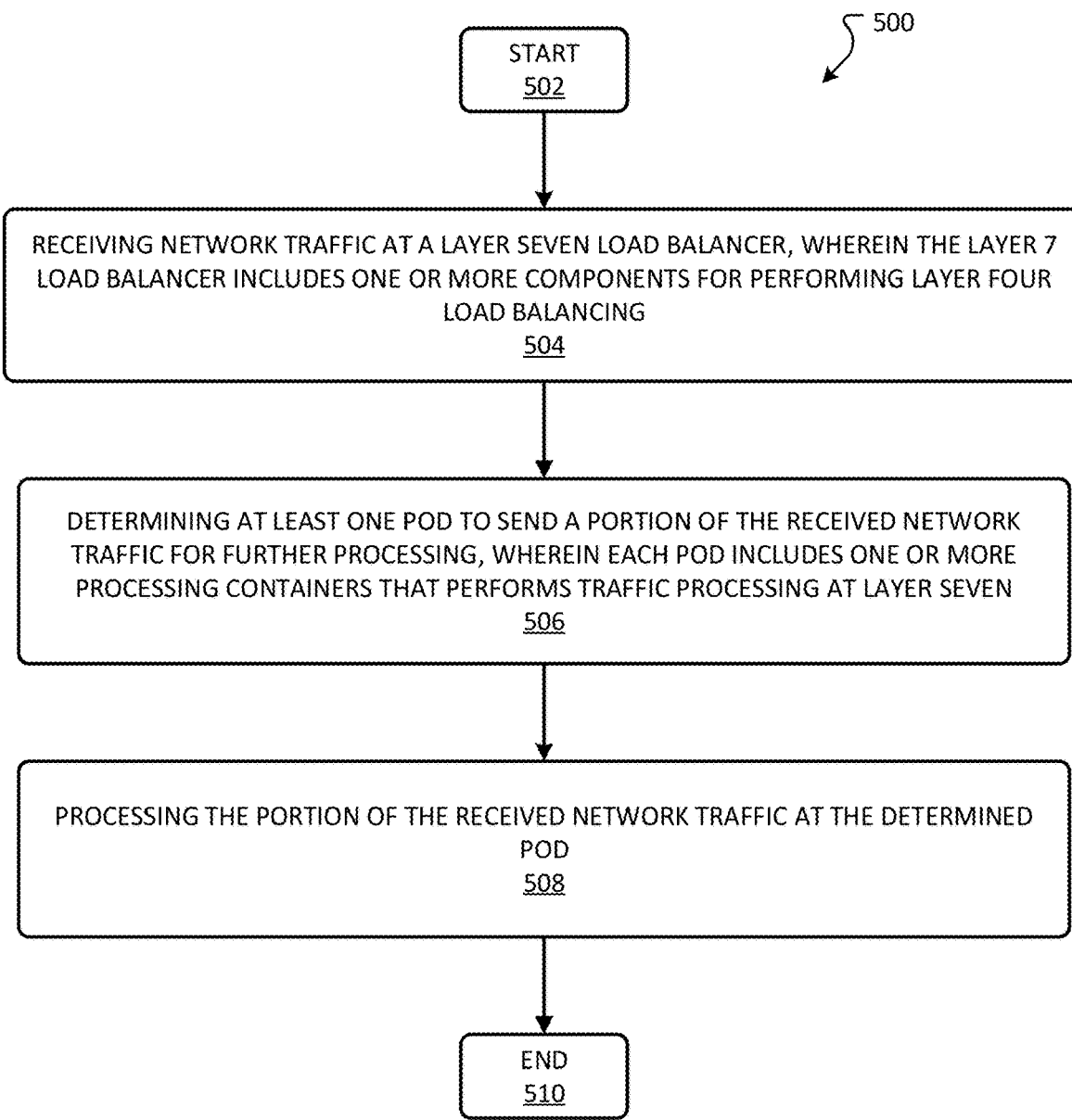
FIG. 5 depicts a simplified method for routing traffic at a load balancer is described in accordance with examples of the present disclosure.

Referring now to FIG. 5, a simplified method for routing traffic at a load balancer is described in accordance with examples of the present disclosure. A general order for the steps of a method 500 is shown in FIG. 5. Generally, the method 500 starts at 502 and ends at 510. The method 500 may include more or fewer steps or may arrange the order of the steps differently than those shown in FIG. 5. The method 500 can be executed as a set of computer-executable instructions executed by a computer system and encoded or stored on a computer readable medium. In an illustrative aspect, the method 500 is executed by a computing device associated with an application gateway for security and privacy (e.g., 212). However, it should be appreciated that aspects of the method 500 may be performed by one or more processing devices, such as a computer, server, or other hardware element. Further, the method 500 can be performed by gates or circuits associated with a processor, Application Specific Integrated Circuit (ASIC), a field programmable gate array (FPGA), a system on chip (SOC), a neural processing unit, or other hardware device. Hereinafter, the method 500 shall be explained with reference to the systems, components, modules, software, data structures, user interfaces, etc. described in conjunction with FIGS. 1-4.

The method 500 starts at 502, where flow may proceed to 504. At 504, internet traffic may be received, for example at a production virtual private data center (e.g., 302), where the traffic may include one or more requests, and the traffic may be routed to one or more components of the application gateway for security and privacy as described in FIG. 2. The application gateway for security and privacy may include a layer 7 load balancer as previously described. The layer 7 load balancer (e.g., 218) may include one or more components to perform layer 4 load balancing (e.g., managing and/or balancing transport-layer protocols, such as but not limited to TCP, UDP, DCCP, and SCTP used to control the volume of data, where it is sent, and at what rate). At 506, the layer 4 load balancer may determine which pod (e.g., 306A-306n) to send received traffic for further processing. Each pod (e.g., 306A-306n) may include one or more Kubernetes, or processing containers 308, that performs traffic processing at the application (e.g., layer 7) level. Each processing container may be configured to perform processing specific to one or more requirements of the pod (e.g., 306A-306n). Thus, at 508, the determined pod may perform processing on the traffic. In examples, the method 500 may end at 510.

Figure 6:
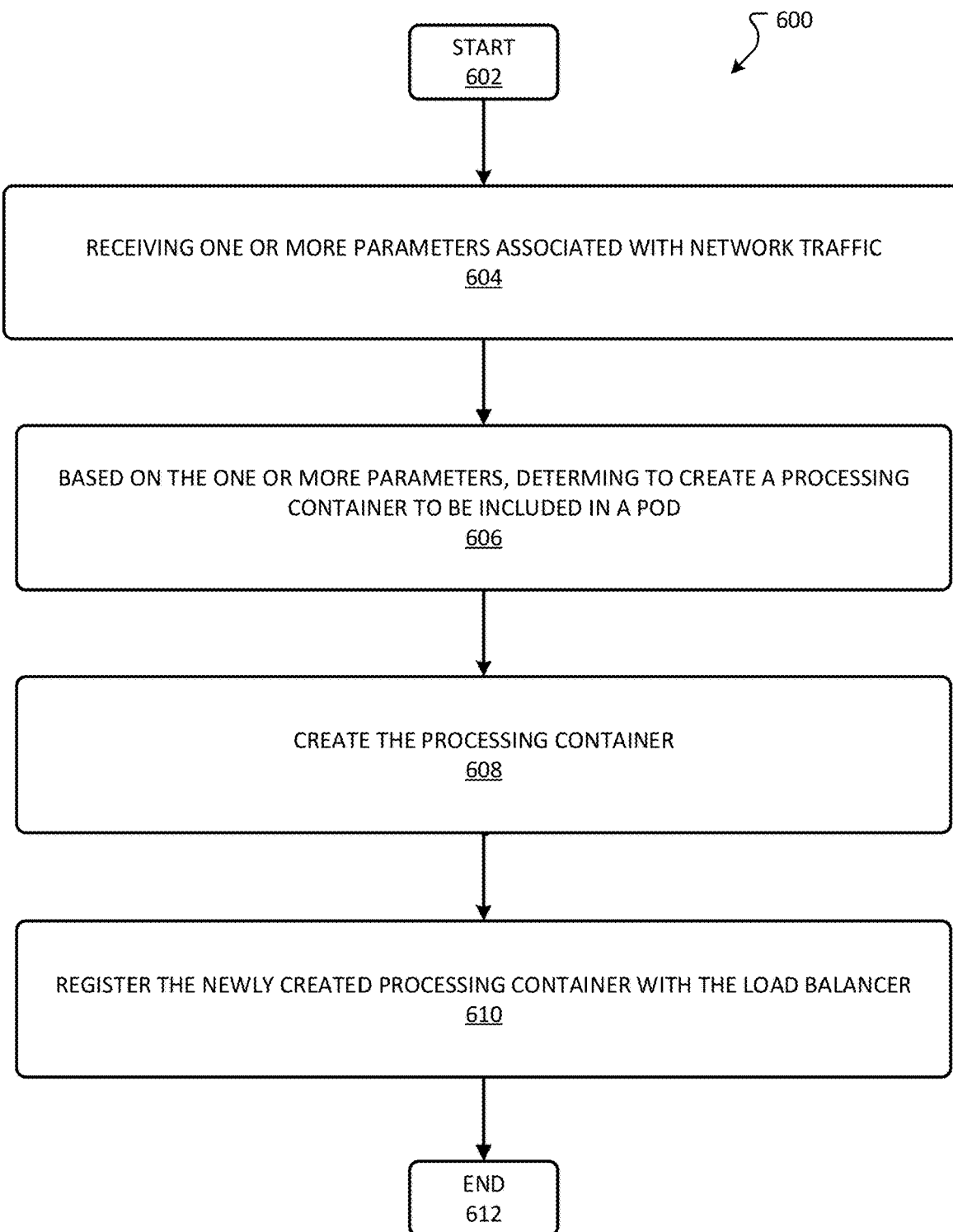
FIG. 6 depicts a simplified method for scaling a network processing ability of a load balancer is described in accordance with examples of the present disclosure.

Referring now to FIG. 6, a simplified method for scaling a network processing ability of a load balancer is described in accordance with examples of the present disclosure. A general order for the steps of a method 600 is shown in FIG. 6. Generally, the method 600 starts at 602 and ends at 610. The method 600 may include more or fewer steps or may arrange the order of the steps differently than those shown in FIG. 6. The method 600 can be executed as a set of computer-executable instructions executed by a computer system and encoded or stored on a computer readable medium. In an illustrative aspect, the method 600 is executed by a computing device associated with an application gateway for security and privacy (e.g., 212). However, it should be appreciated that aspects of the method 500 may be performed by one or more processing devices, such as a computer, server, or other hardware element. Further, the method 600 can be performed by gates or circuits associated with a processor, Application Specific Integrated Circuit (ASIC), a field programmable gate array (FPGA), a system on chip (SOC), a neural processing unit, or other hardware device. Hereinafter, the method 600 shall be explained with reference to the systems, components, modules, software, data structures, user interfaces, etc. described in conjunction with FIGS. 1-5.

The method 600 starts at 602, where flow may proceed to 604. At 604, one or more parameters, such as but not limited to an amount of traffic, associated with network traffic may be received. In examples, and based on one or more parameters, such as but not limited to an amount of traffic, the processing container controller may initiate the creation of a Kubernete, or processing container, to be included in a new or existing pod at 606. Once the processing container is created at 608, the processing container may pull a processing configuration file from the backend manager. The processing configuration may include information indicating what kind of domain does the processing container server, what kind of protocol does the processing container server, what kind of origination policy does the processing container implement, and other detailed configuration information. Once created, at 610, a load balancer controller may register the newly created processing container with the load balancer such that the load balancer may include the new processing container as a resource to route traffic to. Method 600 may end at 612.

Figure 7:
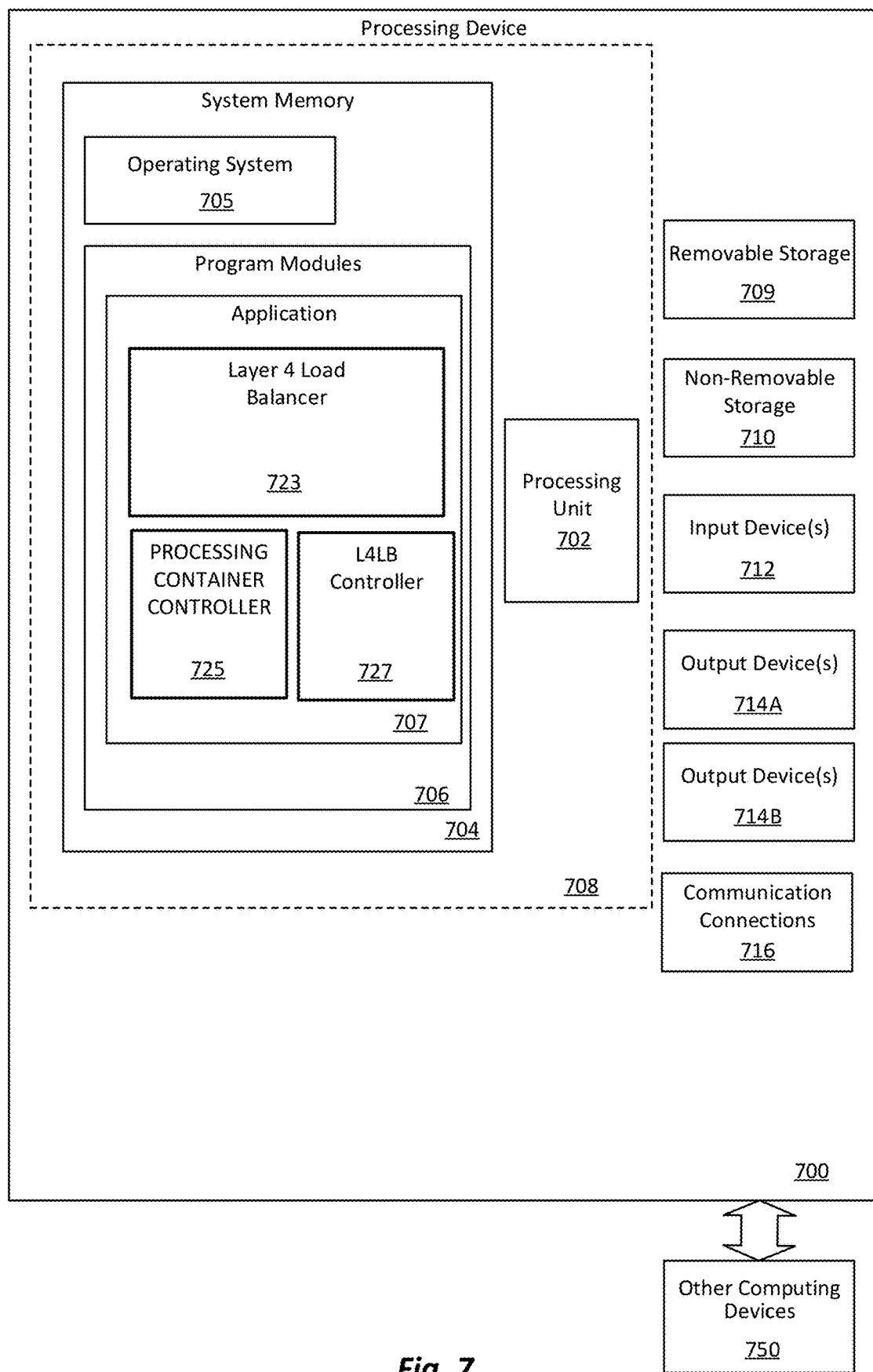
FIG. 7 depicts a block diagram illustrating physical components (e.g., hardware) of a computing device with which aspects of the disclosure may be practiced.

FIG. 7 is a block diagram illustrating physical components (e.g., hardware) of a processing device 700 with which aspects of the disclosure may be practiced. For example, the processing device 700 may represent one or more components as depicted in FIGS. 1-4. In a basic configuration, the processing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for performing the various aspects disclosed herein such. The operating system 705, for example, may be suitable for controlling the operation of the processing device 700. Furthermore, aspects of the disclosure may be practiced in conjunction with other operating systems, or any other application program and is not limited to any particular application or system. This basic configuration is illustrated in FIG. 7 by those components within a dashed line 708. The processing device 700 may have additional features or functionality. For example, the processing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, several program modules and data files may be stored in the system memory 704. While executing on the at least one processing unit 702, the application 707 or the program modules 706 may perform processes including, but not limited to, one or more aspects, as described herein. The application 720 includes a layer 4 load balancer 723, a processing container controller 725, and a layer 4 load balancer controller 727, as described in more detail with regard to FIGS. 1-3. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the processing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The processing device 700 may also have one or more input device(s) 712 such as a keyboard, a mouse, a pen, a sound or voice input device, a touch or swipe input device, etc. The output device(s) 714A such as a display, speakers, a printer, etc. may also be included. An output 714B, corresponding to a virtual display may also be included. The aforementioned devices are examples and others may be used. The processing device 700 may include one or more communication connections 716 allowing communications with other computing or processing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the processing device 700. Any such computer storage media may be part of the processing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The present disclosure relates to an application gateway for security and privacy according to at least the examples provided in the sections below:

(A1) In one aspect, some examples include an application gateway for security and privacy. The application gateway for security and privacy may include a layer four load balancer; a plurality of processing pods including one or more processing containers; and a management backend configured to provide a configuration implementation to the one or more processing containers, the configuration implementation specifying one or more processing parameters for each of the processing containers, wherein each processing pod of the plurality of processing pods includes one or more processing containers configured to perform layer seven network traffic processing on network traffic received from the layer four load balancer in accordance with the one or more processing parameters.

(A2) In some examples of A1, the layer four load balancer is configured to receive network traffic, determine at least one processing pod to send a portion of the received network traffic for further processing, and route the portion of the received network traffic to the determined at least one processing pod.

(A3) In some examples of A1-A2, the application gateway for security and privacy further includes a processing container controller, wherein the processing container controller is configured to receive one or more parameters associated with network traffic and based on the one or more parameters, determine to create a new processing container to be included in a pod.

(A4) In some examples of A1-A3, the processing container controller is configured to cause a new processing container to be created.

(A5) In some examples of A1-A4, the application gateway for security and privacy further includes a load balancer controller configured to register the new processing container with the layer four load balancer.

(A6) In some examples of A1-A5, the one or more processing containers are configured to interrogate the management backend and determine if a new configuration implementation is available, wherein when a new configuration implementation is available, each of the processing containers is configured to perform an update to the new configuration implementation at a time that is different from at least one other processing container.

(A7) In some examples of A1-A6, the application gateway for security and privacy is included in a system for providing enhanced security at a virtual private datacenter, the system including: a virtual private datacenter including the application gateway for security and privacy; and a technology partner datacenter including application services configured to provide requested data based on a request received at the virtual private datacenter.

(B1) In one aspect, some examples include a method of providing enhanced security using an application gateway for security and privacy. The method may include receiving network traffic at a layer four load balancer of the application gateway for security and privacy; determining, by a layer four load balancer, at least one processing pod of a plurality of processing pods to send a portion of the received network traffic for further processing; and routing, by the layer four load balancer, the portion of the received network traffic to the determined at least one processing pod, wherein each processing pod of the plurality of processing pods includes one or more processing containers that is configured to perform layer seven network traffic processing on network traffic received from the layer four load balancer.

(B2) In some examples of B1, the method further includes providing a configuration implementation to the one or more processing containers, the configuration implementation specifying one or more processing parameters for one or more of the processing containers; and performing layer seven network traffic processing on network traffic received from the layer four load balancer in accordance with the one or more processing parameters.

(B3) In some examples of B1-B2, the method further includes receiving one or more parameters associated with network traffic; and based on the one or more parameters, determining to create a new processing container to be included in a pod.

(B4) In some examples of B1-B3, the method further includes causing, by a processing container controller, a new processing container to be created.

(B5) In some examples of B1-B4, the method further includes registering, by a load balancer controller, the new processing container with the layer four load balancer.

(B6) In some examples of B1-B5, the method further includes determining if a new configuration implementation is available; and if a new configuration implementation is available, causing each of the processing containers to perform an update to the new configuration implementation at a time that is different from at least one other processing container.

(B7) In some examples of B1-B6, the processing container is a Kubernete container.

In yet another aspect, some examples include a non-transitory computer-readable storage medium storing one or more programs for execution by one or more processors of a storage device, the one or more programs including instructions for performing any of the methods described herein (e.g., B1-B7 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart or process. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computing system for an application gateway for security and privacy comprising:
   at least one processing unit; and
   a memory storing instructions that are executed by the at least one processing unit to perform the method comprising:
   providing a layer four load balancer;
   providing a plurality of processing pods including one or more processing containers;
   providing a management backend that provides a configuration implementation to the one or more processing containers, the configuration implementation specifying one or more processing parameters for each of the processing containers, the one or more processing parameters includes an amount of received network traffic; and
   a load balancer controller that registers the one or more processing container with the layer four load balancer,
   wherein each processing pod of the plurality of processing pods includes one or more processing containers that performs layer seven network traffic processing on network traffic received from the layer four load balancer in accordance with the one or more processing parameters, at least one additional processing container of the one or more processing containers is created based on the amount of received network traffic, the created least one additional processing container of the one or more processing containers pulls the configuration implementation from the management backend, the created at least one additional processing container is registered with the layer four load balancer by the load balancer controller, and one or more processing containers are discarded when the amount of received network traffic decreases.

2. The computing system for the application gateway for security and privacy of claim 1, wherein the layer four load balancer receives the network traffic, determine at least one processing pod to send a portion of the received network traffic for further processing, and route the portion of the received network traffic to the determined at least one processing pod.

3. The computing system for the application gateway for security and privacy of claim 1, further comprising a processing container controller, wherein the processing container controller receives one or more parameters associated with the network traffic and based on the one or more parameters, determines to create the at least one additional processing container to be included in a pod.

4. The computing system for the application gateway for security and privacy of claim 3, wherein the processing container controller causes the at least one additional processing container to be created.

5. The computing system for the application gateway for security and privacy of claim 1, wherein the one or more processing containers interrogates the management backend and determines if a new configuration implementation is available, wherein when the new configuration implementation is available, each of the processing containers performs an update to the new configuration implementation at a time that is different from at least one other processing container.

6. The computing system for the application gateway for security and privacy of claim 1, wherein the application gateway for security and privacy is included in a system for providing enhanced security at a virtual private datacenter, the system including:
   a virtual private datacenter including the application gateway for security and privacy; and
   a technology partner datacenter including application services that provide requested data based on a request received at the virtual private datacenter.

7. A method of providing enhanced security using an application gateway for security and privacy, the method comprising:
   receiving network traffic at a layer four load balancer of the application gateway for security and privacy;
   determining, by a layer four load balancer, at least one processing pod of a plurality of processing pods to send a portion of the received network traffic for further processing;
   routing, by the layer four load balancer, the portion of the received network traffic to the determined at least one processing pod, wherein each processing pod of the plurality of processing pods includes one or more processing containers that performs layer seven network traffic processing on network traffic received from the layer four load balancer;
   providing a configuration implementation to the one or more processing containers, the configuration implementation specifying one or more processing parameters for one or more of the processing containers, the one or more processing parameters includes an amount of received network traffic, wherein and at least one additional processing container of the one or more processing containers is created based on the amount of received network traffic, and one or more processing containers are discarded when the amount of received network traffic decreases;
   receiving one or more parameters associated with network traffic;
   based on the one or more parameters, determining to create the at least one additional processing container processing container to be included in a pod;

creating, by a processing container controller, the at least one additional processing container processing container based on the determination;

pulling, by the created least one additional processing container of the one or more processing containers, the configuration implementation from a management backend; and registering, by a load balancer controller, the created at least one additional processing container with the layer four load balancer.

8. The method of claim 7, further comprising:

performing layer seven network traffic processing on network traffic received from the layer four load balancer in accordance with the one or more processing parameters.

9. The method of claim 7, further comprising:

determining if a new configuration implementation is available; and if the new configuration implementation is available, causing each of the processing containers to perform an update to the new configuration implementation at a time that is different from at least one other processing container.

10. The method of claim 7, wherein the processing container is a Kubernete container.

11. A non-transitory computer-readable storage medium including instructions, which when executed by a processor, causes the processor to:

receive network traffic at a layer four load balancer of an application gateway for security and privacy;

determine, by a layer four load balancer, at least one processing pod of a plurality of processing pods to send a portion of the received network traffic for further processing;

route, by a layer four load balancer, the portion of the received network traffic to the determined at least one processing pod, wherein each processing pod of the plurality of processing pods includes one or more processing containers that performs layer seven network traffic processing on network traffic received from the layer four load balancer;

provide a configuration implementation to the one or more processing containers, the configuration implementation specifying one or more processing parameters for one or more of the processing containers, the one or more processing parameters includes an amount of received network traffic, wherein and at least one additional processing container of the one or more processing containers is created based on the amount of received network traffic, and one or more processing containers are discarded when the amount of received network traffic decreases;

receive one or more parameters associated with network traffic;

based on the one or more parameters, determine to create the at least one additional processing container processing container to be included in a pod;

create, by a processing container controller, the at least one additional processing container processing container based on the determination;

pull, by the created least one additional processing container of the one or more processing containers, the configuration implementation from a management backend; and register, by a load balancer controller, the created at least one additional processing container with the layer four load balancer.

12. The non-transitory computer-readable storage medium of claim 11, wherein the instructions cause the processor to:

perform layer seven network traffic processing on network traffic received from the layer four load balancer in accordance with the one or more processing parameters.

13. The non-transitory computer-readable storage medium of claim 11, wherein the instructions cause the processor to:

determine if a new configuration implementation is available; and if the new configuration implementation is available, cause each of the processing containers to perform an update to the new configuration implementation at a time that is different from at least one other processing container.

* * * * *